US011985221B2

(12) United States Patent
Wang et al.

(10) Patent No.: US 11,985,221 B2
(45) Date of Patent: May 14, 2024

(54) EFFICIENT MASKING OF SECURE DATA IN LADDER-TYPE CRYPTOGRAPHIC COMPUTATIONS

(71) Applicant: NVIDIA Corporation, Santa Clara, CA (US)

(72) Inventors: Shuai Wang, Shanghai (CN); Chen Yao, Shanghai (CN); Xiao Wu, Shanghai (CN); Rongzhe Zhu, Shanghai (CN); Yuji Qian, Shanghai (CN); Kun Yang, San Jose, CA (US); Xixi Xie, Jiangsu (CN)

(73) Assignee: NVIDIA Corporation, Santa Clara, CA (US)

( * ) Notice: Subject to any disclaimer, the term of this patent is extended or adjusted under 35 U.S.C. 154(b) by 162 days.

(21) Appl. No.: 17/707,596

(22) Filed: Mar. 29, 2022

(65) Prior Publication Data
US 2023/0246806 A1     Aug. 3, 2023

Related U.S. Application Data

(63) Continuation of application No. PCT/CN2022/074568, filed on Jan. 28, 2022.

(51) Int. Cl.
*H04L 9/00*     (2022.01)
*H04L 9/30*     (2006.01)

(52) U.S. Cl.
CPC .............. *H04L 9/003* (2013.01); *H04L 9/302* (2013.01); *H04L 2209/046* (2013.01)

(58) Field of Classification Search
CPC .... H04L 9/003; H04L 9/302; H04L 2209/046
See application file for complete search history.

(56) References Cited

U.S. PATENT DOCUMENTS 5,751,620 A * 5/1998 Monier ............... G06F 7/728
                                     708/492
5,982,900 A * 11/1999 Ebihara ............... G06F 7/728
                                     380/30

(Continued)

FOREIGN PATENT DOCUMENTS

CN         1691580 A      11/2005
CN         1985458 A      6/2007

(Continued)

OTHER PUBLICATIONS

Joye et al., "The Montgomery Power Ladder", LCIS, Dept. of Computer Science and Information Engineering, 2003, pp. 291-302.

(Continued)

*Primary Examiner* — Saleh Najjar
*Assistant Examiner* — Devin E Almeida
(74) *Attorney, Agent, or Firm* — Lowenstein Sandler LLP

(57) ABSTRACT

Disclosed are apparatuses, systems, and techniques to perform and facilitate secure ladder computational operations whose iterative execution depends on secret values associated with input data. Disclosed embodiments use masking factors that re-blind secret data without exposing the unmasked secret data between iterations of the ladder computations. Some disclosed embodiments use Montgomery multiplication techniques to facilitate secret data masking by efficiently avoiding modular division operations. Disclosed embodiments significantly reduce the vulnerability of ladder computations to adversarial side-channel attacks.

20 Claims, 6 Drawing Sheets

(56) References Cited

U.S. PATENT DOCUMENTS

| | | | |
|---|---|---|---|
| 6,008,703 A | 12/1999 | Perrott et al. | |
| 6,085,210 A * | 7/2000 | Buer | G06F 7/723 708/491 |
| 6,088,453 A | 7/2000 | Shimbo | |
| 6,298,442 B1 * | 10/2001 | Kocher | H04L 9/3066 713/193 |
| 6,748,410 B1 * | 6/2004 | Gressel | G06F 7/728 708/491 |
| 7,027,597 B1 * | 4/2006 | Stojancic | H04L 9/3249 708/502 |
| 7,966,361 B1 | 6/2011 | Moni et al. | |
| 9,851,905 B1 | 12/2017 | Ramalingam et al. | |
| 2002/0039418 A1 | 4/2002 | Dror et al. | |
| 2006/0140399 A1 * | 6/2006 | Young | H04L 9/3249 380/30 |
| 2006/0285682 A1 * | 12/2006 | Sarangarajan | G09C 1/00 380/28 |
| 2008/0049931 A1 | 2/2008 | Vasyltsov | |
| 2009/0113252 A1 | 4/2009 | Lambert et al. | |
| 2010/0177887 A1 * | 7/2010 | Ciet | G06F 7/728 380/28 |
| 2013/0114806 A1 * | 5/2013 | Bertoni | G06F 7/728 380/28 |
| 2013/0311532 A1 | 11/2013 | Olsen | |
| 2014/0281573 A1 * | 9/2014 | Jaffe | H04L 9/003 713/189 |
| 2017/0060535 A1 | 3/2017 | Teglia | |
| 2017/0061119 A1 | 3/2017 | Teglia | |
| 2017/0257211 A1 | 9/2017 | Vigilant | |
| 2018/0211065 A1 * | 7/2018 | Jaffe | H04L 9/003 |
| 2019/0036678 A1 * | 1/2019 | Ahmed | H04L 9/008 |
| 2019/0089523 A1 * | 3/2019 | Adjedj | G06F 7/728 |
| 2019/0227736 A1 | 7/2019 | Hong et al. | |
| 2019/0354498 A1 | 11/2019 | Ebsen et al. | |
| 2020/0344056 A1 * | 10/2020 | Guilley | H04L 9/302 |
| 2021/0083840 A1 * | 3/2021 | Tunstall | H04L 9/3249 |
| 2021/0243006 A1 | 8/2021 | Meyer | |
| 2022/0075879 A1 | 3/2022 | Hamburg et al. | |
| 2022/0085998 A1 * | 3/2022 | Xiao | H04L 9/003 |
| 2022/0085999 A1 * | 3/2022 | Hamburg | H04L 9/003 |
| 2023/0195418 A1 | 6/2023 | Kondru | |

FOREIGN PATENT DOCUMENTS

| | | |
|---|---|---|
| CN | 102207847 A | 10/2011 |
| CN | 108111309 A | 6/2018 |
| CN | 108228137 A | 6/2018 |
| CN | 108833120 A | 11/2018 |
| CN | 111712816 A | 9/2020 |
| TW | 201437910 A | 10/2014 |
| WO | 2005048008 A2 | 5/2005 |
| WO | 2021211678 A1 | 10/2021 |

OTHER PUBLICATIONS

International Search Report and Written Opinion for International Application No. PCT/CN2022/074567, dated Sep. 28, 2022, 6 Pages.

International Search Report and Written Opinion for International Application No. PCT/CN2022/074568, dated Oct. 26, 2022, 8 Pages.

International Search Report and Written Opinion for International Application No. PCT/CN2022/074569, dated May 30, 2022, 9 Pages.

International Search Report and Written Opinion for International Application No. PCT/CN2022/074570, dated Oct. 26, 2022, 7 Pages.

* cited by examiner

EFFICIENT MASKING OF SECURE DATA IN LADDER-TYPE CRYPTOGRAPHIC COMPUTATIONS

RELATED APPLICATIONS

The application claims the benefit of priority under 35 U.S.C. 365 to the international application PCT/CN2022/074568, filed Jan. 28, 2022 with the China National Intellectual Property Administration, which is hereby incorporated in its entirety.

TECHNICAL FIELD

At least one embodiment pertains to the technologies used to perform and facilitate protection of cryptographic computations from unauthorized attacks that attempt to gain access to secret keys and other secure information. Disclosed are computational techniques and systems that reduce potential exposure of sensitive data during encryption and decryption operations involving ladder-type cryptographic computations.

BACKGROUND

The strength of cryptographic applications depends on how well secret keys used by these applications are protected from unauthorized accesses and malicious attacks. Even keys that are resistant to brute-force attacks (e.g., attacks that check various possible key values) may be vulnerable to side-channel attacks. In a side-channel attack, an attacker performs monitoring of various signals (e.g., electric signals) produced by electronic circuits of the target computer. Based on the recorded signals, a hardware trojan or a malicious software can correlate processor and/or memory activity with operations carried out by the target computer. A simple power analysis (SPA) side-channel attack can determine electric power consumed by the device as a function of time, since different operations, such as storing, erasing, flipping, etc., bits of data can require slightly different amounts of energy for their performance. As noise can mask the signals emitted by the processor/memory, even more sophisticated differential power analysis (DPA) attacks can be carried out, which include examination of statistical correlations of the power measurements performed over multiple cryptographic operations (or multiple iterations of a single cryptographic operation). A DPA attacker can filter out the noise component of the power signal and extract the component of the signal that is representative of the processing operations. This can reveal secret information (e.g., private key values) that is otherwise well-protected against brute-force attacks. Various methods of obfuscation aimed to reduce correlations between signals emitted by a computing device and operations performed thereon are often used to reduce the likelihood of success of side-channel attacks.

DETAILED DESCRIPTION

Figure 1:
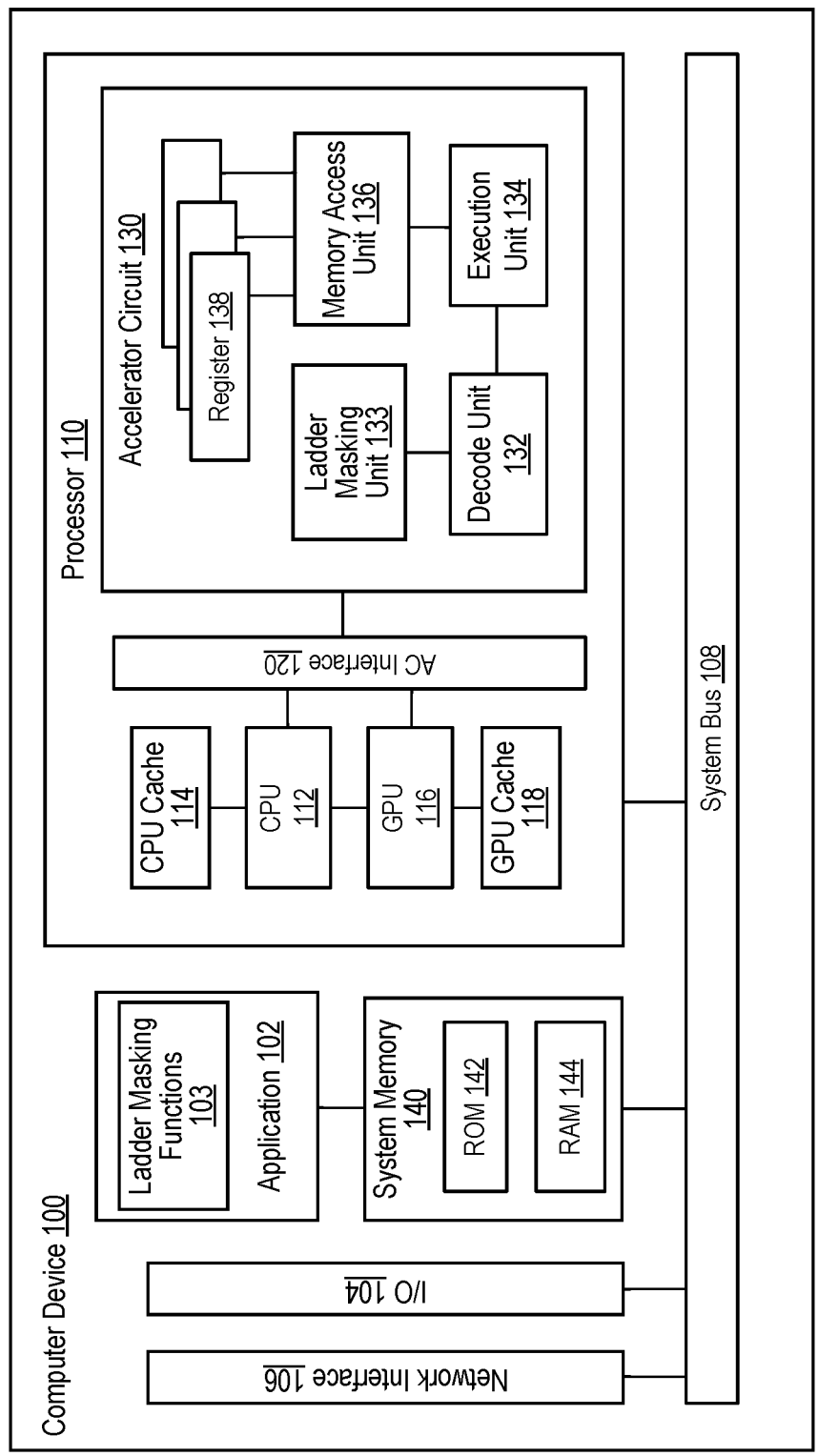
FIG. 1 is a block diagram of an example computer device 100 capable of performing ladder computations with iteration masking for enhanced protection against side-channel attacks, in accordance with at least some embodiments.

Public/private key cryptography is a staple component of modern computer software and hardware systems, used in a multitude of applications, including confidential communications, time-stamping, non-repudiation protocols, cryptocurrency, and so on. In some systems, a cryptographic application may be instantiated during system boot and used for all secure data communications (e.g., between a processor and a system memory). In public-key cryptography systems, a computing device may perform operations on large binary numbers as part of various algorithms, such as Rivest-Shamir-Adelman (RSA), Diffie-Hellman (DH), elliptic curve cryptography (ECC) algorithms, etc., to encrypt and/or decrypt secret messages, digital signature algorithms (DSA) to authenticate messages, and so on. Cryptographic algorithms typically involve modular arithmetic operations, in which integers are wrapped around a circle of length P (the ring $Z_P$), so that any two numbers that differ by P (or any other integer of P) are treated as the same number.

An RSA cryptographic application may generate private/public keys by selecting a pair of large prime numbers, e.g., $p_1$ and $p_2$, selecting a public (encryption) exponent e and then computing a secret (decryption) exponent d that is based on the public (encryption) exponent e and the selected numbers $p_1$ and $p_2$. The numbers e and $P=p_1 \cdot p_2$ may subsequently be revealed to other actors as part of the public key while $p_1$, $p_2$, and d are stored (as the secret private key) by the recipient of future secret communications. A sender may encrypt a plaintext message m by computing a ciphertext message c using modular exponentiation, $c=m^e$ mod P, and communicate c (e.g., publicly) to the recipient. The recipient may then decrypt the ciphertext by applying another modular exponentiation, $m=c^d$ mod P. The original plaintext message m is recovered provided that the value of the decryption exponent d is selected in such a way that the encryption and decryption exponents are inverse of each other, e d=1, modulo a suitably chosen number, e.g., $(p_1-1) \cdot (p_2-1)$.

In ECC applications, numbers are associated with points on elliptic curves (e.g., Weierstrass curves) with special rules defined for various arithmetic operations, e.g., addition, subtraction, doubling, multiplication, etc. The nature of the elliptic curves ensures that a product of two large numbers $Y=X \cdot K$ on an elliptic curve can be practically anywhere on the curve so that recovering an unknown number K from known numbers X and Y may be a prohibitively difficult computational task.

An exponentiation operation $Z=X^K$ mod P (e.g., in RSA applications) or a multiplication operation Z=X·K e.g., (in ECC applications) may be easily performed via K multiplication or addition iterations, but values of K (e.g., cryptographic key values) are typically large numbers. Accordingly, to speed up the computations, various ladder-type algorithms may be used, such as the Montgomery ladder, double-and-add ladder, Joye double-and-add ladder, etc., that perform the exponentiation much faster, in approximately $\log_2$ K iterations. For example, in the Montgomery ladder exponentiation algorithm, two registers, e.g., R0 and R1, may be used to store an accumulator value and an auxiliary value. More specifically, prior to execution of the Montgomery ladder, a value 1 may be stored in an accumulator register, R0←1 and the base of the exponential function may be stored in an auxiliary register, R1←. During each iteration, a value $k_j$ associated with the iteration determines which register's value is squared, whereas the other register's new value is obtained by multiplication of the values stored in both registers.

As an illustration, raising a base number X to power K=22 (having the binary value $(k_4k_3k_2k_1k_0)$=10110, may be performed in five iterations, with the first iteration ($k_4$=1) squaring the number stored in R1: R0←1·X=X, R1←$X^2$, the second iteration ($k_3$=0) squaring the number stored in R0: R0←$X^2$, R1←X·$X^2$=$X^3$, the third iteration ($k_2$=1) squaring the number stored in R1: R0←$X^2$·$X^3$=$M^5$, R1←$X^6$, the fourth iteration ($k_1$=1) squaring the number stored in R1: R0←$X^5$·$X^6$=$X^{11}$, R1←$X^{12}$, and the final iteration ($k_0$=0) squaring the number stored in R0: R0←$X^{22}$, R1←$X^{11}$·$X^{12}$=$X^{23}$. (Each of the above multiplication and squaring operations may be a modular operation modulo P.) The output of the exponentiation operation is then given by the number in the accumulator register R0, e.g., $X^{22}$, in this example. The exponentiation is, therefore, performed using only [$\log_2$ 22]+1=5 iterations (with the brackets [·] indicating taking the integer value of the number therein).

An attacker can generate a large number of messages and cause a cryptographic engine or an application to decrypt these messages using the secret exponent d (e.g., K in the above example) and correlate power signals emitted by the cryptographic engine (or a general-purpose processor executing a cryptographic application) to the bits of the secret exponent using the known values of the generated messages (e.g., X in the above example). Various methods of blinding (masking) are, therefore, often used to randomize inputs processed by cryptographic engines and to hinder collection of meaningful power consumption statistics by an attacker. For example, an input value X can be masked using a random number r: Y=r mod P, which is used to mask the input value, X→X·Y, and the exponentiation operation performed in the usual manner to compute a masked output, $Z_M=(X·Y)^d$ mod P. The correct output is then determined by performing an unmasking operation, $Z_M \to Z=Z_M·r^{-d}$ mod P. The cost of such a masking procedure, however, is a modular inverse ($r^{-1}$) and an additional exponentiation ($r^{-d}$) of the random number.

In RSA applications, to reduce the computational costs of the masking, the relation between the private exponent d and the public exponent e (which is often selected to be a small number or an easily manageable number having few different bits, e.g., 3, $2^{16}$+1, etc., can be used, namely, d·e=1 (mod $(p_1-1)·(p_2-1)$). This relation allows to perform unmasking according to a simplified procedure. For example, an input value X can be masked using a random number r which is raised to the power of the public exponent to obtain a masking number $Y=r^e$ mod P, which is used to mask the input value, X→X·Y, and the exponentiation operation performed in the usual manner using the decremented exponent d−1 to compute a masked output, $Z_M=(X·Y)^{d-1}$ mod P. The correct output is then determined by performing an unmasking operation, $Z_M \to Z=Z_M·X·r^{e-1}$ mod P. Such a masking procedure, however, is limited to RSA applications and would not be applicable to protection of digital signature algorithms and other non-RSA applications.

Aspects and embodiments of the present disclosure address these and other challenges of the existing technology by introducing masking into iterations of ladder computations in such a way that all intermediate operations (e.g., multiplication and squaring) are masked and only the final output appears in the unmasked form, after all conditional (dependent on bits of the secret keys) operations have been completed. In some embodiments, at each iteration j, an unmasking value UM(j) is identified that is sufficient to unmask the current (intermediate) values stored in the accumulator register, e.g., R0, and the auxiliary register, e.g., R1. To avoid exposing the intermediate values, the unmasking value, however, is not applied directly to the values R0 and R1. Instead, during the next iteration j−1 (with the lower numbers indicating later iterations), a masking value M(j−1) may be selected (e.g., randomly), the masking factor M(j−1)·UM(j) may be constructed and applied to R0 and R1 before performing the ladder operations (e.g., before the operations R0←$(R0)^2$ and R1←R0·R1). As a result, after iteration j, the current values R0 and R1 are masked by $[M(j)]^2$ and could be unmasked using the unmasking value UM(j)=$[M(j)]^{-2}$. Correspondingly, after the last iteration (e.g., iteration 0), the final values R0 and R1 can be unmasked using the final unmasking value UM(0)= $[M(0)]^{-2}$. In some embodiments, the masking (and unmasking) values may be powers of a base number (e.g., 2), e.g., M(j)=$2^{Y(j)}$, with randomly chosen Y(j). Consequently, the masking factor M(j−1)·UM(j)=$2^{Y(j-1)-2Y(j)}$ can sometimes be the base number taken to a negative power Y(j−1)−2Y(j)<0. The masking operation may, therefore, involve a division (e.g., a modular division), which is a computationally expensive operation.

[00.18] In some embodiments, to avoid the division operations, each masking exponent Y(j) may be selected within a fixed range of values, e.g., [0, r/2−1], and the unmasking value may be forced to be a positive power of the base number by adding, UM(j)=$2^{r-2Y(j)}$. The masking factor, (j−1)·UM(j), therefore, brings an extra multiplier $2^r$ to the values R0 and R 1 at the beginning of each iteration, which translates to the extra factor $2^{2r}$ accumulated at the end of each iteration. To prevent accumulation of n extra factors $2^{2r}$, which can amount for a very large number $2^{2nr}$, a Montgomery reduction with radix $2^{2r}$ can be used to eliminate the extra factor $2^{2r}$ in the course of each iteration.

The advantages of the disclosed devices and techniques include, but are not limited to, increased resistance of ladder computations to SPA, DPA, and other side-channel attacks, and a significant improvement of security of sensitive and confidential data during encryption, decryption, authentication, etc., of such data.

System Architecture

FIG. 1 is a block diagram of an example computer device 100 capable of performing ladder computations with iteration masking for enhanced protection against side-channel attacks, in accordance with at least some embodiments. Example computer device 100 depicted in FIG. 1 may be a desktop computer, a tablet, a smartphone, a server (local or remote), a thin/lean client, a cloud computing node, a card reader, a wireless sensor node, an Internet-of-Things (IoT) node, an embedded system dedicated to one or more specific applications, and so on. One or more applications 102 may be executed on computer device 100.

Application(s) 102 supported by computer device 100 may include machine-learning application(s), graphics application(s), computational application(s), cryptographic application(s) (such as authentication, encryption, decryption, secure storage application(s), etc.), embedded application(s), external application(s), or any other types of application(s) that may be executed by computer device 100. Application(s) 102 may be instantiated on the same computer device 100, e.g., by an operating system executed by computer device 100. Alternatively, application(s) 102 may be external application(s) instantiated by a guest operating system supported by a virtual machine monitor (hypervisor) operating on the computer device 100. In some embodiments, the external application(s) may reside on a remote access client device or a remote server (not shown), with the computer device 100 providing cryptographic support for the client device and/or the remote server.

The computer device 100 may include one or more processors 110. "Processor" refers to any device capable of executing instructions encoding arithmetic, logical, or I/O operations. In one illustrative example, a processor may follow Von Neumann architectural model. Processor 110 may include a central processing unit (CPU) 112, which may have any number of arithmetic logic units (ALUs), floating-point units (FPUs), control units, registers, and so on. CPU 112 may be executing at least some operations of application(s) 102. CPU 112 may include one or more cores having access to a single or multi-level cache 114. In some embodiments, each core may execute instructions to run a number of threads, also known as logical cores. Various logical cores may be assigned to one or more application(s) 102, although more than one logical core may be assigned to a specific application 102 for parallel processing. A multi-core CPU 112 may simultaneously execute multiple instructions. A single-core CPU 112 may typically execute one instruction at a time (or process a single pipeline of instructions). CPU 112 may be implemented as a single integrated circuit, two or more integrated circuits, or may be a component of a multi-chip module.

In some embodiments, some operations of application(s) 102 may be executed by one or more graphics processing units (GPUs) 116. GPU 116 may include multiple cores, each core being capable of executing multiple threads. Each core may run multiple threads concurrently (e.g., in parallel). In some embodiments, GPU threads may have access to thread-specific (private) GPU registers. Additionally, one or more shared GPU registers may be accessed by all threads of the GPU core. In at least one embodiment, each GPU core may include a scheduler to distribute computational tasks and processes among different GPU threads. GPU 116 may also have a dispatch unit to implement scheduled tasks on appropriate GPU threads using correct private and shared GPU registers. In some embodiments, GPU 116 may have a cache 118, access to which may be shared by multiple GPU cores. In some embodiments, CPU 112 may execute processes that involve serial computational tasks, whereas GPU 116 may execute tasks that are amenable to parallel processing. In some embodiments, application(s) 102 may determine which processes are to be executed on GPU 116 and which processes are to be executed on CPU 112. In other embodiments, CPU 112 may determine which processes are to be executed on GPU 116 and which processes are to be executed on CPU 112. In some embodiments, processor 110 may include one or more application-specific integrated circuits (ASICs), field-programmable gate arrays (FPGAs), finite state machines (FSMs), and the like.

Processor 110 may have access, e.g., over a system bus 108, to one or more system memory 140 devices. System memory 140 may refer to any volatile or non-volatile memory and may include a read-only memory (ROM) 142, a random-access memory (RAM) 144, as well as (not shown) electrically erasable programmable read-only memory (EEPROM), flash memory, flip-flop memory, or any other device capable of storing data. RAM 144 may be a dynamic random-access memory (DRAM), synchronous DRAM (SDRAM), a static memory, such as static random-access memory (SRAM), and the like. In some implementations, processor 110 and the system memory 140 may be implemented as a single controller, e.g., as an FPGA.

Processor 110 may include an accelerator circuit 130 (accelerator co-processor, accelerator engine). One or more application(s) 102 may perform cryptographic operations on processor 110 with one or more functions, e.g., ladder masking functions 103, performed by accelerator circuit 130. Accelerator circuit 130 may include various accelerator function units, e.g., ladder masking unit 133 to implement computations that support ladder masking functions 103 of application(s) 102, as described in more detail below. Accelerator circuit 130 may be communicatively coupled to CPU 112 and/or GPU 116 via accelerator circuit interface (AC interface) 120. In some embodiments, accelerator circuit 130 may perform a portion of cryptographic computations executed by processor 110. For example, CPU 112 (and/or GPU 116) may be executing an RSA algorithm while performing a number of (modular) exponentiations to encrypt and/or decrypt various plaintext and/or ciphertext messages using ladder-type techniques. In the course of performing a ladder exponentiation for a predetermined modulus P, e.g., $Y=X^K$ mod P, CPU 112 (and/or GPU 116) may provide a value of the first input number X and the second input number K to accelerator circuit 130, and accelerator circuit 130 may compute the output value Y and return the computed value to CPU 112 (and/or GPU 116).

Accelerator circuit 130 may include a decode unit 132 (also known as a decoder), which may be coupled to an instruction fetch unit (not depicted in FIG. 1). Decode unit 132 may decode instructions, and generate one or more micro-operations, micro-code entry points, microinstructions, other instructions, or other control signals, which are decoded from, or which otherwise reflect, or are derived from, the original instructions. Decode unit 132 may be implemented using various mechanisms, e.g., look-up tables, hardware implementations, programmable logic arrays (PLAs), microcode read only memories (ROMs), and the like.

Decode unit 132 may be coupled to an execution unit 134, which may include a scheduler unit (not depicted in FIG. 1). Decode unit 132 and execution unit 134 may be coupled to one or more registers 138 via a memory access unit 136. Each register 138 may store one or more different data types, such as scalar integer, scalar floating point, packed integer, packed floating point, vector integer, vector floating point, etc., status (e.g., an instruction pointer that is the address of the next instruction to be executed), etc.

In some embodiments, decode unit 132 may receive instructions from CPU 112 (and/or GPU 116) that may include an identification of the operation to be performed (e.g., modular exponentiation, modular division, modular inversion, etc.) together with the input values (e.g., X, K and/or P). Decode unit 132 may store the received input values in registers 138. Decode unit 132 may also store (or access previously stored) additional numbers (e.g., Montgomery radix values), as described in more detail below. Decode unit 132 may then use a decoding circuitry to determine one or more operations to be performed on the input values by execution unit 134, such as multiplication, squaring, addition, doubling, etc. operations, and the like. During execution of the operations by execution unit 134, intermediate values may be stored in registers 138. After the completion of the modular division or inversion computations, the final output may be moved to CPU cache 114 (or GPU cache 118). In some embodiments, after completion of the computations, memory access unit 136 may provide to CPU 112 (or GPU 116) an identification of a register 138 storing the final output and CPU 112 (or GPU 116) may fetch the final result directly from the corresponding register.

The computer device 100 may further include an input/output (I/O) component 104 to facilitate connection of computer device 100 to various peripheral hardware devices (not shown) such as card readers, terminals, printers, scanners, IoT devices, and the like. Computer device 100 may further include a network interface 106 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 100.

The following operations illustrated in TABLE 1 represent one possible embodiment of a Montgomery ladder exponentiation that uses masking to hide inputs and outputs of iterations of the ladder computations from possible adversarial attacks. The embodiment of TABLE 1 raises an n-bit number X to a power of K, which may also be an n-bit number. The operations illustrated in TABLE 1 may be modular operations modulo a modulus number P (which may also be an n-bit number).

TABLE 1

Montgomery ladder exponentiation with iteration masking

Input: X, K = $(k_{n-1}, \ldots k_0)_2$, P, n; // n is the bit width of X, K, P;
Output: Z = X^K mod P 1. R0 := 1; R1 := X; UM(n) := 1;
2. for j = n−1 downto 0 do
3.   Select a random number Y(j) from [0 ... r−1], where r is smaller than n/4
4.   M(j) = $2^{Y(j)}$;
5.   MF(j) := UM(j+1) × M(j);
6.   R0: = R0 × MF(j); R1 := R1 × MF(j);
7.   if ($k_j$ = 0) then R0 := (R0)² mod P; R1 := R0 × R1 mod P;
8.   if ($k_j$ = 1) then R1 := (R1)² mod P; R0 := R0 × R1 mod P;
9.   UM(j) := $[M(j)]^{-2}$
10.  endfor
11.  R0 := R0 × UM(0) mod P
11.  return R0

In the embodiment of TABLE 1, n iterations of masking, squaring, and multiplication are performed, each iteration being associated with a respective bit of K. At the start of each iteration (line 3), a masking exponent Y(j) for the iteration may be selected (e.g., randomly) and used (line 4) to generate a masking value MU). A masking factor MF(j) may then be computed (line 5) that is then used (in line 6) to simultaneously remove, the unmasking value M(j+1), the masking applied in the course of the previous iteration j+1 and apply the masking value MU) of the current iteration. The conditional ladder operations (squaring and multiplication) may then be applied (in lines 7-8) to the current values of the accumulator R0 and the auxiliary value R1: the squaring operation R0←(R0)² and the multiplication operation R1 R0·R1, if the bit $k_1$ has a first value $k_j$=0, or the squaring operation R1←(R1)² and the multiplication operation R0←R0·R1, if bit $k_1$ has a second value $k_1$=1. Additionally (or in parallel), a new unmasking value UM(j)=$[M(j)]^{-2}$ may be computed (line 9), accounting for the fact that the masking value is squared in the performance of the ladder computations. Additional iterations may be performed, each iteration including further masking and ladder computations. After completions of the final iteration, the value of the accumulator R0 represents the target output still masked with the final iteration's masking value, Z·$[M(0)]^2$. The output is returned after (at line 11) the final masking value is removed. Operations of TABLE 1 are further illustrated in FIG. 2.

Figure 2:
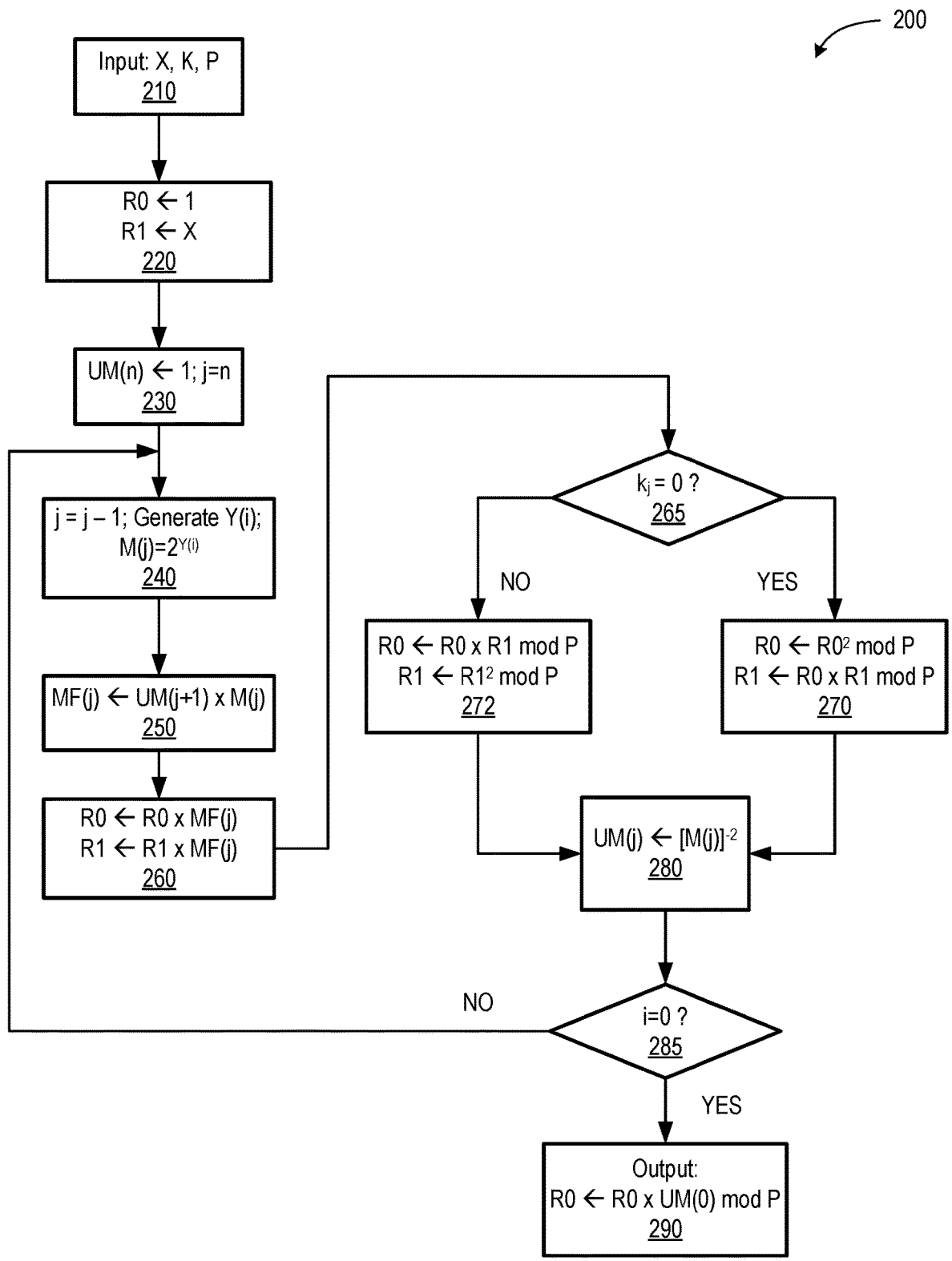
FIG. 2 depicts a flowchart illustrating example operations of a Montgomery ladder exponentiation with masking of inputs and outputs of ladder iterations for enhanced protection against side-channel attacks, in accordance with at least some embodiments.

FIG. 2 depicts a flowchart illustrating example operations 200 of a Montgomery ladder exponentiation with masking of inputs and outputs of ladder iterations for enhanced protection against side-channel attacks, in accordance with at least some embodiments. Example operations 200 correspond to the operations of TABLE 1 and may be implemented by various units of accelerator circuit 130. In some implementations, example operations 200 may be implemented by a combination of CPU 112 (GPU 116) and accelerator circuit 130, by a combination of accelerator circuit 130 and software executed by CPU 112 (GPU 116), or purely by software executed by CPU 112 (GPU 116). More specifically, the input (block 210) into operations 200 may include a base X of the exponential function, an exponent K of the exponential function, and modulus P that defines the size of the ring on which various arithmetic operations are defined. At block 220, a first register may be seeded with value 1, and the base number X may be seeded in a second register. The value stored in the first register may serve as the accumulator value R0 from which the target output Z is retrieved after completion of all iterations. The value stored in the second register may serve as an auxiliary value R1 that is used to support ladder computations. At block 230, an unmasking value may be stored (e.g., in a third register) and may initially be set to one, UM(n)=1, since the initial values stored in the first register and the second register are not yet masked. Furthermore, at block 230, an iteration counter can be initialized with the value j=n (or value j=−1 in the instances where ladder operations are performed starting from the least significant bit of K).

At block 240, the iteration counter is decremented and the first iteration is started by generating a masking exponent Y(j), which may be a random (or a pseudo-random) number. The masking exponent Y(j) may be used to generate a masking value MU), e.g., by raising a base number (a number of digits used by the processing device executing operations 200) to the power of Y(j). In some embodiments, the base number may be 2, so that M(j)=$2^{Y(j)}$). At block 250, a masking factor MF(j) may be formed using the masking value MU) and the unmasking value UM(j+1) for the previous iteration: MF(j)=UM(j+1)·M(j). At block 260, the masking factor MF(j) may be applied to the current accumulator value R0 and the current auxiliary value R1. Because the masking factor MF(j) includes both the unmasking (for iteration j+1) part and the new masking part, the re-blinding of the accumulator value R0 and the auxiliary value R1 occurs without revealing the actual (unmasked) values of R0 and R1.

At decision-making block 265, a branch of the ladder computations may be selected. If the value of the bit $k_1$ is equal to zero, operations of block 270 are performed, which include squaring the (masked) accumulator value R0 and multiplying the (masked) values R0 and R1 to obtain the new auxiliary value: $R0 \leftarrow (R0)^2$, $R1 \leftarrow R0 \cdot R1$. If the value of the bit $k_1$ is equal to one, operations of block 272 are performed, which include squaring the (masked) auxiliary value R1 and multiplying the values R0 and R1 to obtain the new accumulator value: $R1 \leftarrow (R1)^2$, $R0 \leftarrow R0 \cdot R1$. At block 280, which may be performed after (as shown in FIG. 2), before, or concurrently with block 270 or 272, an unmasking value may be computed for the current iteration, $UM(j) \leftarrow [M(j)]^{-2}$. The unmasking value $UM(j)$ is sufficient to unmask the actual values of both R0 and R1 even though the actual unmasking is postponed until all iterations are complete. In the meantime, the unmasking value $UM(j)$ is used during the next iteration $j-1$ to form the next masking factor $MF(j-1)=UM(j) \cdot M(j-1)$.

At block 285, the operations 200 determine if the last iteration has been completed, e.g., if $j=0$. Provided that $j \neq 0$ the operations return to block 240 where the iteration counter is decremented (or incremented, if the operation progresses towards more significant bits of K) and the next set of blocks 240-280 is performed. When the last iteration has been performed ($j=0$), the masked accumulator value R0 is unmasked at block 290, $R0 \leftarrow R0 \cdot UM(0)$ and the unmasked value R0 is provided as the output $Z=X^K$ mod P, e.g., by fetching the output from the register storing R0.

The operations 200 include computing and applying the masking factor $MF(j)=UM(j+1) \cdot M(j)$, e.g., $MF(j)=2^{Y(j)-2Y(j+1)}$. For masking exponents selected randomly within the same fixed interval, e.g., $[0, r-1]$, in two thirds (on average) of all iterations, the ensuing exponent $Y(j)-2Y(j+1)$ is negative, resulting in the masking operations, e.g., R0 MF(j) mod P, that are modular division operations. Because division operations have higher computational costs, in some embodiments, the exponents $Y(j)-2Y(j+1)$ may be forced to be positive by selecting the masking exponents $Y(j)$ within hierarchical intervals of values. For example, the first iteration $j=n-1$ may include selecting the masking exponent within the range, $Y(n-1) \in [0, s)$, the next iteration $j=n-1$ may include selecting the masking exponent within the range, $Y(n-2) \in [2s, 3s)$, and so on, with the iteration j including selecting the masking exponent within the range, $Y(j) \in [(2^{n-j}-2) \cdot s, (2^{n-j}-1) \cdot s)$. Since each subsequent masking exponent is greater than twice the previous masking exponent, $Y(j) > 2Y(j+1)$, all masking operations, $R0 \leftarrow R0 \cdot MF(j)$ mod P, and $R1 \leftarrow R1 \cdot MF(j)$ mod P, are automatically ensured to be modular multiplication operations (rather than division operations). In one example embodiment, a Montgomery ladder exponentiation with hierarchical masking exponents may be performed as illustrated in TABLE 2.

TABLE 2

Montgomery ladder exponentiation with hierarchical masking exponents

Input: X, K = $(k_{n-1}, \ldots k_0)_2$, P, n; // n is the bit width of X, K, P;
Output: Z = X^K mod P 1. R0 := 1; R1 := X; Y(n) := 0;
2. for j = n−1 downto 0 do
3.   Select a random number $Y(j) \in [(2^{n-j} - 2) \cdot s, (2^{n-j} - 1) \cdot s)$.
4.   $MF(j) := 2^{Y(j+1)-2Y(j)}$;
5.   R0: = R0 × MF(j); R1 := R1 × MF(j);
6.   if ($k_j$ = 0) then R0 := (R0)² mod P; R1 := R0 × R1 mod P;
7.   if ($k_j$ = 1) then R1 := (R1)² mod P; R0 := R0 × R1 mod P;

TABLE 2-continued

Montgomery ladder exponentiation with hierarchical masking exponents

Input: X, K = $(k_{n-1}, \ldots k_0)_2$, P, n; // n is the bit width of X, K, P;
Output: Z = X^K mod P 8. endfor
9. R0 := R0 × $2^{-2Y(0)}$ mod P
10. return R0

As illustrated in TABLE 2, the operations of the ladder exponentiation with hierarchical masking exponents are modular multiplication operations with the exception of the last unmasking operation (line 9), which is a modular division operation. The example embodiment of TABLE 2 is intended as an illustration, in which each masking exponent is selected from equal intervals of numbers of width s, but it should be understood that any similar exponentiation with hierarchical masking exponents satisfying the following conditions: $Y(0) > 2Y(1) > 4Y(2) > 8Y(3) > \ldots$.

In some embodiments, modular multiplications in TABLE 1 and TABLE 2 may use reduction modulo P that is based on the Montgomery multiplication technique. More specifically, to compute AB mod P, the numbers A and B may first be transformed to the Montgomery domain, A mod $P \to \overline{A}=A \cdot 2^n$ mod P, B mod $P \to \overline{B}=B \cdot 2^n$ mod P, where $2^n$ is a number commonly referred to as the Montgomery radix. Because of the presence of the extra factor $2^n$ in the product $\overline{A} \cdot \overline{B}=(A \cdot B \cdot 2^n) \cdot 2^n$ mod P, the number $\overline{A} \cdot \overline{B}$ is not equal to the Montgomery representation $\overline{C}$ of the product $C=A \cdot B$, as an extra division by $2^n$ needs to be performed: $\overline{C}=\overline{A} \cdot \overline{B} \cdot 2^{-n}$ mod P. To efficiently compute $\overline{A} \cdot \overline{B} \cdot 2^{-n}$ mod P, a number $S=-P^{-1}$ mod $2^n$ may be selected, such that $M \cdot S+1 = m \cdot 2^n$ with some integer m. By construction, it then follows that the number $P(\overline{A} \cdot \overline{B} \cdot S$ mod $2^n)$ may be added to the product $\overline{A} \cdot \overline{B}$ without changing its value modulo P:

$$\overline{A} \cdot \overline{B} \bmod P = [\overline{A} \cdot \overline{B} + P(\overline{A} \cdot \overline{B} \cdot S \bmod 2^n)] \bmod P.$$

Furthermore, the presence of $P(\overline{A} \cdot \overline{B} \cdot S$ mod 2n) makes the number $\overline{A} \cdot \overline{B}+P(\overline{A} \cdot \overline{B} \cdot S$ mod $2^n)$ a multiple of $2^n$, since $$[\overline{A} \cdot \overline{B} + P(\overline{A} \cdot \overline{B} \cdot S \bmod 2^n)] \bmod 2^n = [\overline{A} \cdot \overline{B} \cdot (1+P \cdot S)] \bmod 2^n = 0 \bmod 2^n.$$

Division of $\overline{A} \cdot \overline{B}+P(\overline{A} \cdot \overline{B} \cdot S$ mod $2^n)$ by $2^n$ is then easily performed by right-shifting by n bits with the result yielding the Montgomery representation $\overline{C}$ of the product $C=A \cdot B$ mod P. (If the result exceeds P, $\overline{C}$ is obtained by one additional subtraction of P). In the Montgomery representation, any number of consecutive modular multiplications may be performed directly in the Montgomery domain (with only a final output $\overline{O}$ transferred back from the Montgomery domain to the standard domain, $\overline{O} \to O$).

The Montgomery multiplication techniques may be used to further increase the entropy of masking. In particular, while the embodiments discussed in conjunction with TABLE 2 ensure that the difference of the masking exponents $Y(j)-2Y(j+1)$ is positive, such an advantage is achieved by randomly selecting each exponent $Y(j)$ from a range of values (e.g., of width s) that is less than the total range of values (e.g., of width r) that is available for selecting the masking exponents. The Montgomery multiplication techniques provide a general recipe for removing an inverse of the Montgomery radix (e.g., $2^n$ or any other radix) from a multiplication product of two numbers and, as described below, enable to broaden the interval of numbers from which masking exponents are selected.

More specifically, the following operations illustrated in TABLE 3 represent one possible embodiment of a Montgomery ladder exponentiation that uses Montgomery multiplication techniques for more efficient masking of the ladder computations. The embodiment of TABLE 3 raises an n-bit number X to a power of K, which may also be an n-bit number. The operations illustrated in TABLE 3 may be operations modulo P (which may also be an n-bit number).

TABLE 3

Montgomery ladder exponentiation with iteration masking that uses Montgomery multiplication Input: X, K = $(k_{n-1}, \ldots k_0)_2$, P, n; // n is the bit width of X, K, P;
$2^{2n+2r}$ mod P
Mont1[A, B] = A × B × $2^{-2r}$ mod P
Mont2[A, B] = A × B × $2^{-n}$ mod P
Output: Z = X^K mod P 1. R0 := $2^{n+2r}$ mod P; R1 := Mont2[X, $2^{2n+2r}$]; UM(n) := $2^r$;
2. for j = n−1 downto 0 do
3.   Select a random number Y(j) from [0 . . . (r/2)−1], where r is smaller than n/2
4.   M(j) = $2^{Y(j)}$;
5.   MF(j) := UM(j+1) × M(j);
6.   R0: = Mont1[R0, MF(j)]; R1 := Mont1[R1, MF(j)];
7.   if ($k_j$ = 0) then R0 := Mont2[R0, R0]; R1 := Mont2[R0, R1];
8.   if ($k_j$ = 1) then R1 := Mont2[R1, R1]; R0 := Mont2[R0, R1];
9.   UM(j) := $2^{r-2Y(j)}$
10. endfor
11. R0 := Mont1[R0, UM(0)]
12. R0 := Mont1[R0, $2^r$]
13. R0 := Mont2[R0, 1]
14. return R0

In the embodiment of TABLE 3, n iterations of masking, squaring, and multiplication are performed, each iteration being associated with a respective bit of K. Masking in the embodiment of TABLE 3 is performed in such a way that the unmasking value at the end of each iteration, UM(j)=$2^{r-2Y(j)}$, is a positive power of the base number, with r>2Y(j). The presence of the value r in the exponent is achieved by seeding the initial values R0 and R1 with additional powers of $2^r$ (line 1) and eliminating extra powers $2^{2r}$ generated during performance of conditional ladder computations (lines 7-8) using Montgomery multiplication with radix $2^{2r}$.

In some embodiments, two Montgomery multiplication operations (functions) may be defined and used. The first Montgomery multiplication operation (small Montgomery multiplication) may be a Montgomery multiplication with radix $2^{2r}$: Mont1[A, B]=A·B·$2^{-2r}$ mod P. The second Montgomery multiplication operation (large Montgomery multiplication) may be a Montgomery multiplication with radix $2^n$, Mont2 [A, B]=A·B·$2^{-n}$ mod P, with n>r. The first Montgomery multiplication operation is used to mask the current accumulator value R0 and the current auxiliary value R1 (line 6). In some embodiments, r may be selected to be smaller than n/2 for improved efficiency of computations of line 6, which involve multiplication of n-bit values R0 and R1 by r-bit masking factors MF(j). On the other hand, values of r that are not too low improve efficiency of masking (e.g., masking entropy). In one example non-limiting embodiment, n=2048 while r=128 or 256. Each masking factor MF(j)=UM(j+1)·M(j) may include the scaling factor $2^r$ introduced into the seed unmasking factor UM(n) in line 1 and into the subsequent masking factors UM(n−1), UM(n−2) . . . UM(0) in line 9. This procedure maintains consistent scaling of the accumulator value R0 and the auxiliary value R1 with the first Montgomery radix $2^{2r}$ at the completion of each ladder iteration. Namely, the first Montgomery multiplication operations of line 6 involve ordinary multiplications of R0 or R1 (each scaled with $2^{2r}$) by the masking factor MF(j) (scaled with $2^r$), thus bringing the total scaling to $2^{3r}$, followed by the Montgomery reduction by $2^{2r}$. As a result, after line 9 computations, each of R0 and R1 is scaled with $2^r$. The bilinear ladder computations (e.g., R1←$(R1)^2$ and R0←R0·R1) of lines 8-9 then restore the scaling of R0 and R1 to $2^{2r}$. After all iterations are complete, the final masking may be removed, at line 12, by performing the first Montgomery multiplication operation on the accumulator value R0 (scaled with $2^{2r}$) and the final unmasking value UM(0) (scaled with $2^r$). The output of line 12 is, therefore, scaled with $2^r$ ($2^{2r} \times 2^r \div 2^{2r}$). An additional first Montgomery multiplication operation of line 13, applied to the accumulator value R0 (now scaled with $2^r$) and the factor $2^r$ removes this factor ($2^r \times 2^r \div 2^{2r}$) from the accumulator value R0.

In some embodiments, the second Montgomery multiplication operation (with radix $2^n$) may be used to facilitate efficient modular multiplications (modulo P). More specifically, the accumulator value R0 and the auxiliary value R1 may be seeded (at line 1) with additional scaling factors $2^n$. Subsequently, the scaling factor $2^n$ is maintained throughout the ladder iterations. Namely, the second Montgomery multiplication operations used in lines 7-8 involve multiplication or squaring of R0 and/or R1 (bringing up the scaling factor to $2^{2n}$) followed by the Montgomery reduction by $2^n$. After all iterations are complete, one additional second Montgomery multiplication operation may be performed (in line 13) on (i) the accumulator value R0 and (ii) value 1 to remove the scaling factor $2^n$ ($2^n \times 1 \div 2^n$) and obtain the target output of the exponentiation operation.

Figure 3:
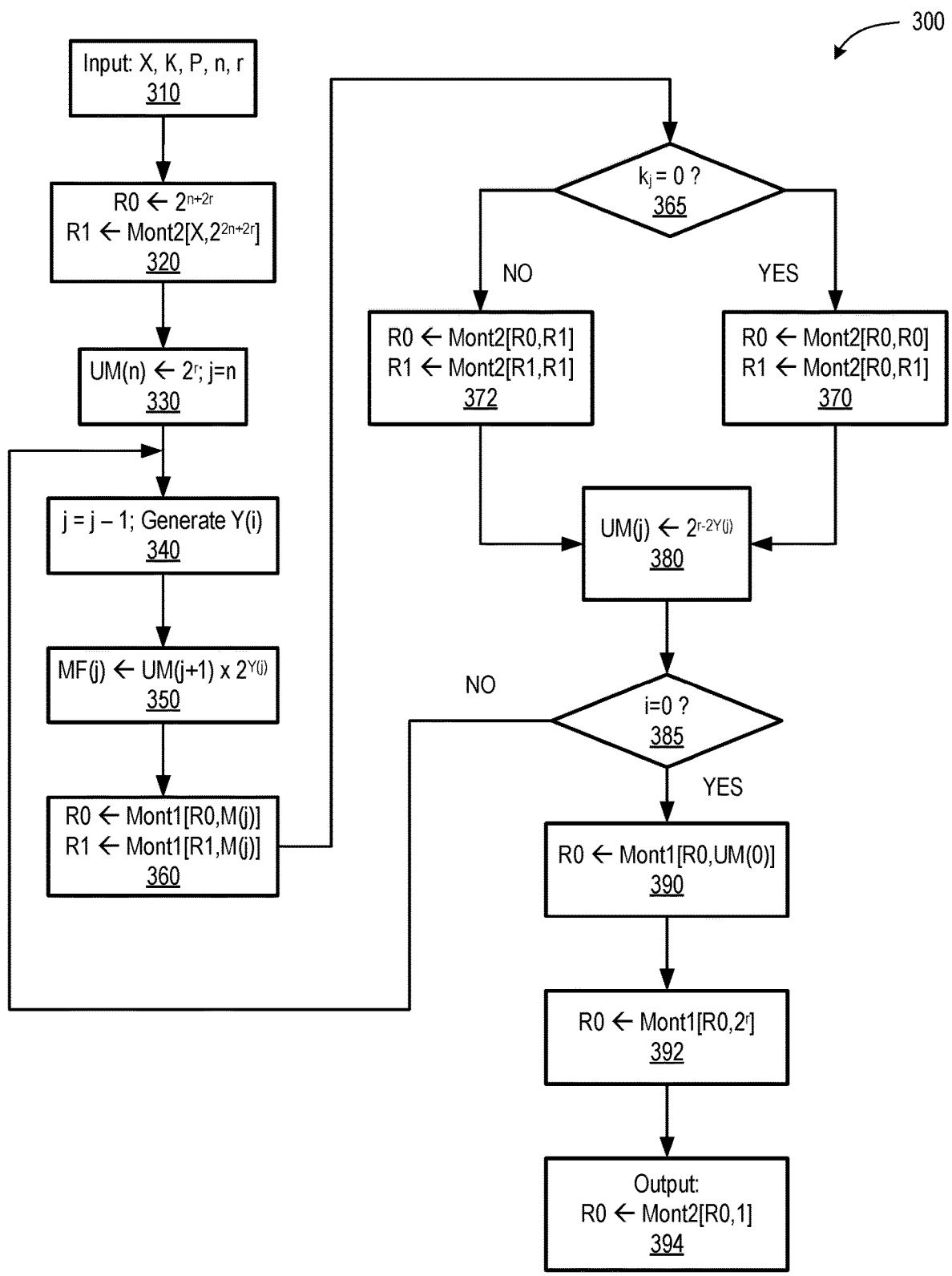
FIG. 3 depicts a flowchart illustrating example operations of Montgomery ladder computations with iteration masking that deploys Montgomery multiplication for enhanced protection against side-channel attacks, in accordance with at least some embodiments.

FIG. 3 depicts a flowchart illustrating example operations 300 of Montgomery ladder computations with iteration masking that deploys Montgomery multiplication for enhanced protection against side-channel attacks, in accordance with at least some embodiments. Example operations 300 correspond to the operations of TABLE 3 and may be implemented by various units of accelerator circuit 130. In some implementations, example operations 200 may be implemented by a combination of CPU 112 (GPU 116) and accelerator circuit 130, by a combination of accelerator circuit 130 and software executed by CPU 112 (GPU 116), or purely by software executed by CPU 112 (GPU 116). The input (block 310) into operations 300 may include a base X of the exponential function, an exponent K of the exponential function, and modulus P that defines the size of the ring on which various arithmetic operations are defined. Additionally, the input may include an exponent r of the first Montgomery multiplication operation (first Montgomery radix $2^{2r}$) and exponent n of the second Montgomery multiplication operation (second Montgomery radix $2^n$). At block 320, a first register may be seeded with value $2^{2n+2r}$. An output of the second Montgomery multiplication operations applied to (i) the base number X and (ii) $2^{2n+2r}$ may be stored in a second register. The value stored in the first register may serve as the accumulator value R0 from which the target output Z is retrieved after completion of all iterations. The value stored in the second register may serve as an auxiliary value R1 that is used to support the ladder computations. At block 330, an unmasking value may be stored (e.g., in a third register) and may initially be set to the square root of the first Montgomery radix, UM(n)=$2^r$. Furthermore, at block 330, an iteration counter can be initialized with value j=n.

At block 340, the iteration counter is decremented and the first iteration is started by generating a masking exponent Y(j), which may be a random (or a pseudo-random) number. The masking exponent Y(j) may be used to generate a masking value MU), e.g., by raising a base number (a number of digits used by the processing device executing operations 300) to the power of Y(j). In some embodiments, the base number may be 2, so that $M(j)=2^{Y(j)}$. At block 250, a masking factor MF(j) may be generated using the masking value M(j) and the unmasking value UM(j+1) for the previous iteration: $MF(j)=UM(j+1) \cdot M(j)$. At block 360, the masking factor MF(j) may be applied to the current accumulator value R0 and the current auxiliary value R1. The application of the masking factor MF(j) may be performed using the first Montgomery multiplication operation. As a result of masking operations of block 360, each of the accumulator value R0 and the auxiliary value R1 is scaled with the scaling factor $2^{n+r+Y(j)}$. Because the masking factor MF(j) includes both the unmasking (iteration j+1) part and the new masking part, the re-blinding of the accumulator value R0 and the auxiliary value R1 occurs without revealing the actual (unmasked) values of R0 and R1.

At decision-making block 365, a branch of the ladder computations for updating the values R0 and R1 may be selected. If the value of the bit $k_1$ is zero, operations of block 270 are performed, which include squaring the (masked) accumulator value R0 and multiplying the (masked) values R0 and R1 to obtain the new auxiliary value: $R0 \leftarrow (R0)^2$, $R1 \leftarrow R0 \cdot R1$. Both the squaring and the multiplying may be performed using the second Montgomery multiplication operation. If the value of the bit $k_j$ is one, operations of block 372 are performed, which include using the second Montgomery multiplication operation to square the (masked) auxiliary value R1 and to multiply the values R0 and R1 to obtain the new accumulator value: $R0 \leftarrow (R0)^2$, $R1 \leftarrow R0 \cdot R1$. As a result of the ladder operations of block 370 or block 372, each of the updated accumulator value R0 and the auxiliary value R1 is scaled with the scaling factor $2^{n+2r+2Y(j)}$. At block 380, which may be performed after (as shown in FIG. 3), before, or concurrently with operation 370 or 372, an unmasking value may be computed for the current iteration, $UM(j) \leftarrow 2^{r-2Y(j)}$. The unmasking value UM(j) is sufficient to unmask (up to the deterministic factor $2^{n+r}$) the actual values of both R0 and R1 even though the actual unmasking may be postponed until all iterations are complete. In the meantime, the unmasking value UM(j) is used (at block 350) during the next iteration j−1 to build the next masking factor $MF(j-1)=UM(j) \cdot M(j-1)$.

At block 385, the operations 300 determine if the last iteration has been completed, e.g., if j=0. Provided that j≠0, the operations return to block 340 where the iteration counter is decremented (or incremented, if the operation progresses towards more significant bits of K) and the next set of blocks 340-380 is performed. When the last iteration has been performed (j=0), the masked accumulator value $R0 \cdot 2^{n+2r+2Y(0)}$ may be subjected to a series of operations of blocks 390-394 that strips away various scaling factors. More specifically, at block 290, the masking value is removed, $R0 \cdot 2^{n+2r+2Y(0)} \rightarrow R0 \cdot 2^{n+r}$. At block 292, the square root of the first Montgomery radix is removed, $R0 \cdot 2^{n+r} \rightarrow R0 \cdot 2^{n}$. Finally, at block 294, the second Montgomery radix is removed, $R0 \cdot 2^{n} \rightarrow R0$, and the value R0 is provided as the output $Z=X^K \mod P$, e.g., by fetching the output from the register storing R0.

In some embodiments, each instance of the first Montgomery multiplication operation $A \cdot B \cdot 2^{-2r} \mod P$ may be performed using N iterations, each iteration computing a partial Montgomery multiplication $A_i \cdot B \cdot 2^{-2r/N} \mod P$ for a respective word $A_i$ of N words of the multiplier $A=(A_{N-1} \ldots A_0)$, as illustrated in TABLE 4 below.

TABLE 4

Montgomery multiplication with partial product reduction

Input: $A=(A_1, A_0)$, B, P, $S=-P^{-1} \mod 2^r$;
Output: $O = A \times B \times 2^{-2r} \mod P$ 1. $O := 0$;
2. for i = 0 to 1 do
3.    $O := O + A_i \times B$;
4.    $Q_i := O \times S \mod 2^r$;
5.    $O := (O + Q_i \times P) \mod 2^r$;
6. end
7. if (O > P), then $O := O - P$;
8. return O TABLE 4 illustrates an example embodiment with N=2 iterations (defined by the for-environment between lines 2-6 of TABLE 4), but any suitable number of iterations may be used instead. For example, the number of iterations may be determined by the size of the words of the multiplier $A_i$ (and/or words of the multiplicand B) that may be processed by multiplication circuit(s) of the processing device that performs the Montgomery multiplication. In line 3, a partial product of a word $A_i$ of the multiplier is multiplied by the multiplicand (e.g., using systolic multiplication). In line 4, a quotient $Q_i$ for the current iteration i is computed. In line 5, the quotient $Q_i$ is multiplied by the modulus P and added to the accumulator O; the division by $2^r$ is then performed by right-shifting the value O by r bits to the right. After completion of all N iterations, the value O is within the interval [0, 2P−1]. If the value O is greater than P, the output of the (first) Montgomery multiplication is obtained by subtracting the value P from O (line 7).

Figure 4:
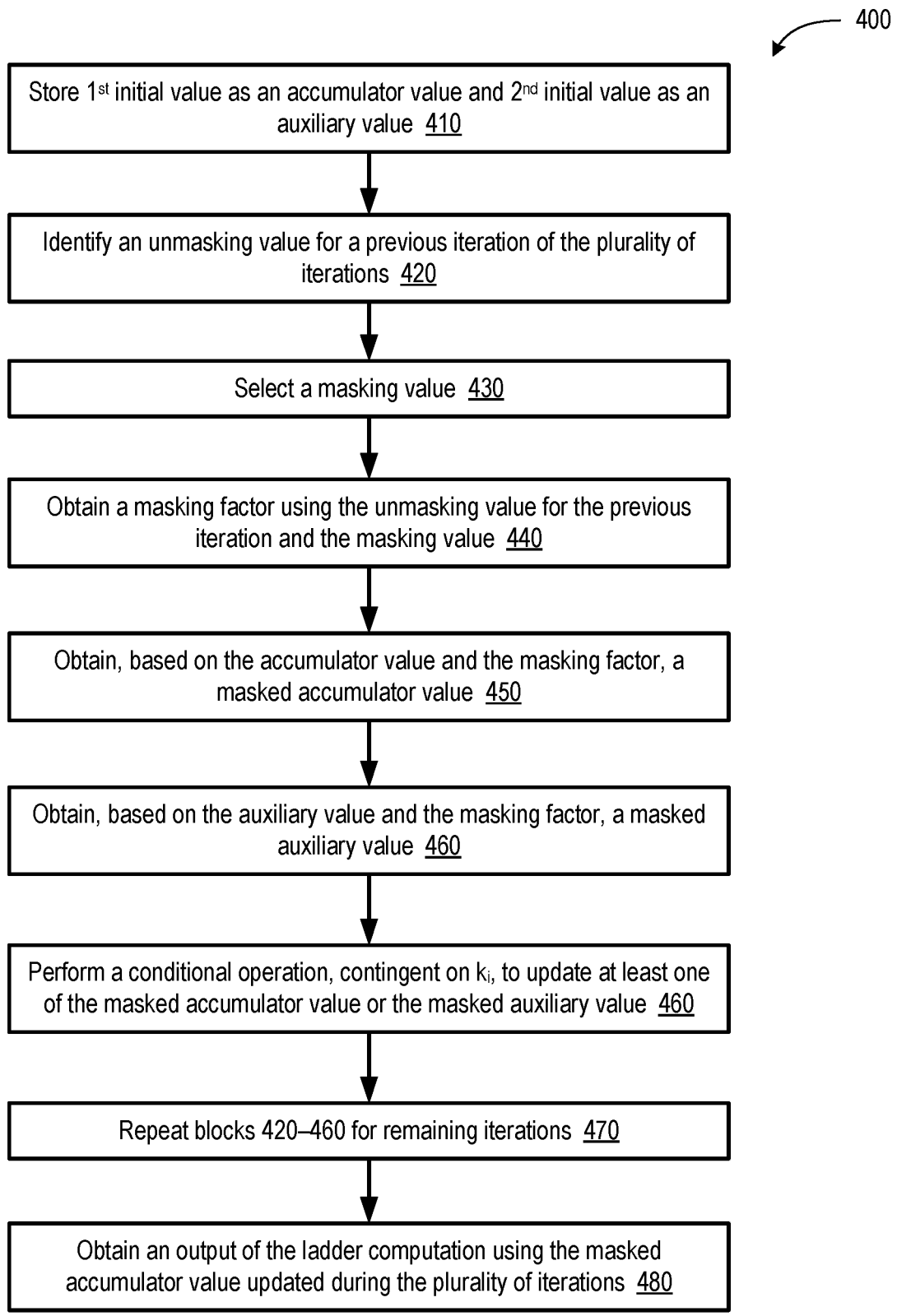
FIG. 4 is a flow diagram of an example method of ladder computations with iteration masking for enhanced protection against side-channel attacks, in accordance with at least some embodiments.
Figure 5:
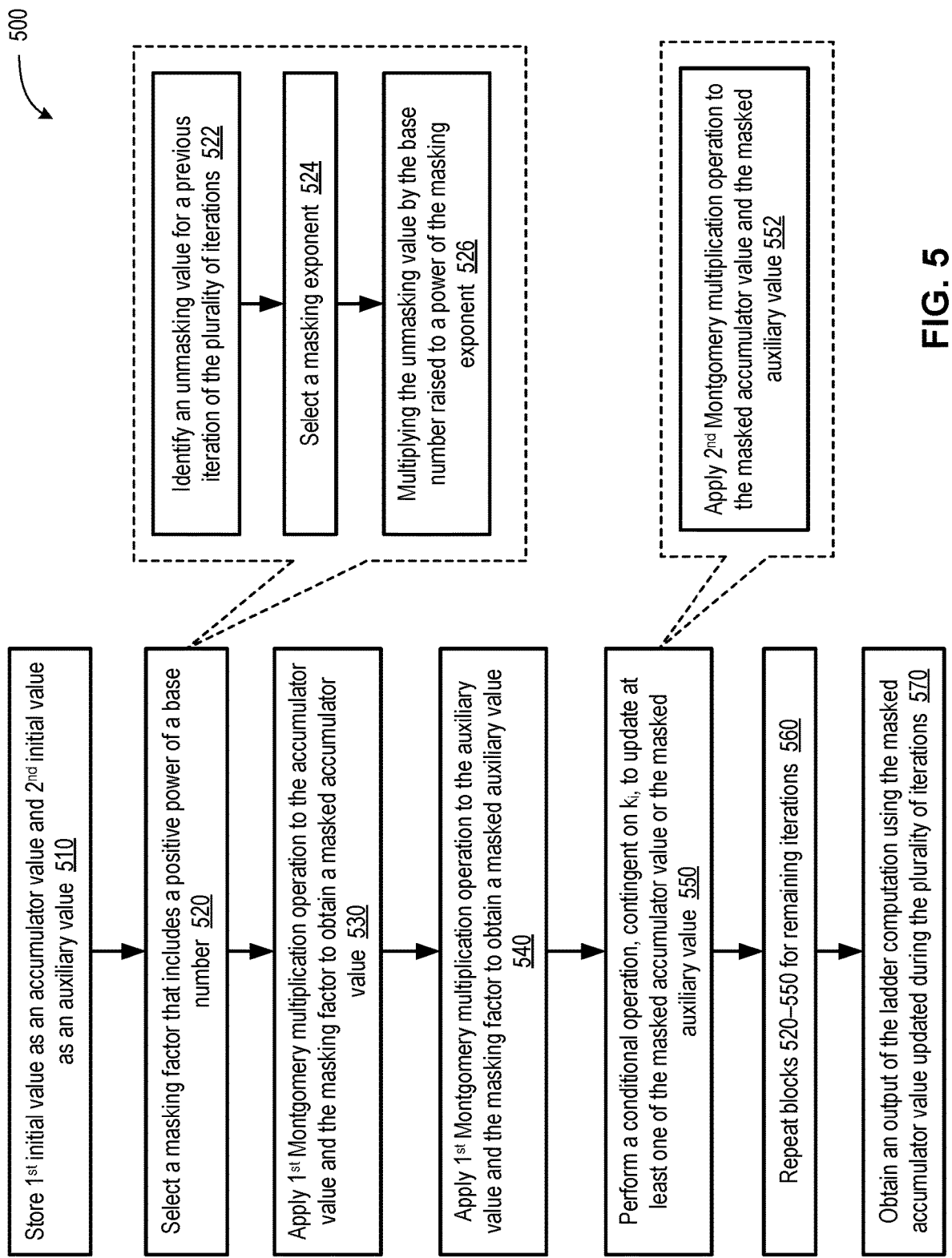
FIG. 5 is a flow diagram of example method of ladder computations with iteration masking that deploys Montgomery multiplication for enhanced protection against side-channel attacks.

FIG. 4 and FIG. 5 are flow diagrams of example methods 400 and 500, respectively, of iteration masking during performance of ladder computations for enhanced protection against side-channel attacks, in accordance with at least some embodiments. In some embodiments, method 400 may be performed by processing units that may include (or communicate with) one or more memory devices (e.g., registers). In some embodiments, methods 400 and 500 may be performed responsive to instructions from CPU 112 (or GPU 116). In some embodiments, methods 400 and 500 may be executed by one or more processing threads, each thread executing one or more individual functions, routines, subroutines, or operations of the methods. In some embodiments, processing threads implementing each of methods 400 and 500 may be synchronized (e.g., using semaphores, critical sections, and/or other thread synchronization mechanisms). Alternatively, processing threads implementing methods 400 and 500 may be executed asynchronously with respect to each other. Various operations of methods 400 and 500 may be performed in a different order compared with the order shown in FIG. 4 and FIG. 5. Some operations of methods 400 and 500 may be performed concurrently with other operations. In some embodiments, one or more operations shown in FIG. 4 and FIG. 5 may be optional.

Methods 400 and 500 may be performed by a dedicated accelerator engine, e.g., accelerator circuit 130 of FIG. 1. In some embodiments, methods 400 and 500 may be performed by a cryptographic engine configured to perform public/private key cryptographic computations, or by a general-purpose CPU (or GPU). Processing units that perform methods 400 and 500 may include decode unit 132, execution unit 134, memory access unit 136, and other units of accelerator circuit 130 (e.g., fetch unit, scheduler unit, etc.). Ladder computations performed using method 400 may be a Montgomery ladder computation, a double-andadd ladder computation, or any other ladder computation. The ladder computations may involve a first input (e.g., X) and a second input (e.g., K) and may include exponentiation of the first input to a power of the second input (e.g., $Y=X^K$ mod P).

FIG. 4 is a flow diagram of example method 400 of ladder computations with iteration masking for enhanced protection against side-channel attacks, in accordance with at least some embodiments. In some embodiments, method 400 may include, at block 410, storing a first initial value as an accumulator value and storing a second initial value as an auxiliary value. At least one of the first initial value or the second initial value may be based on the first input, e.g., the first initial value may be 1, and the second initial value may be X. Method 400 may include a plurality of iterations. Each of the plurality of iterations $j=n-1, n-2, \ldots 1, 0$ may be associated with a respective bit $k_j$ of a plurality of bits ($k_{n-1}$, $k_{n-2}, \ldots k_1, k_0$) of the second input K. The operations of each iteration may include blocks 420-460. In particular, at block 420, e.g., during performance of iteration j, the processing units performing method 400 may identify an unmasking value UM(j+1) for a previous iteration (e.g., iteration j+1) of the plurality of iterations. In those instances where no previous iteration has been performed, the unmasking value may be set to one, UM(n)=1. In some embodiments, the unmasking value for the previous iteration may be an inverse square of a masking value for the previous iteration: $UM(j+1)=[M(j+1)]^{-2}$.

At block 430, method 400 may continue with the processing units selecting a masking value for the current iteration, M(j). In some embodiments, the masking value may be a base number (e.g., 2, or any other suitable number of digits used to represent numbers by the processing units) raised to a power of a masking exponent, e.g., $M(j)=2^{Y(j)}$. Corresponding, the unmasking value of block 420 may have been $UM(j+1)=2^{-2Y(j+1)}$. In some embodiments, the masking exponent (for the current iteration j) is greater than twice a masking exponent for the previous iteration (iteration j+1): $Y(j)>2Y(j+1)$.

At block 440, method 400 may include obtaining a masking factor using the unmasking value for the previous iteration and the current masking value, such as MF(j)=UM (j+1)·M(j) (e.g., $MF(j)=2^{Y(j)-2Y(j+1)}$). At block 450, method 400 may continue with the processing units obtaining, based on the accumulator value (e.g., R0) and the masking factor (e.g., MF(j), or any other suitable masking factor), a masked accumulator value (e.g., R0←R0·MF(j)). Similarly, at block 460, method 400 may continue with the processing units obtaining, based on the auxiliary value (e.g., R1) and the masking factor, a masked auxiliary value (e.g., R1←R1 MF(j)). At block 460, the processing units may perform a conditional operation. The conditional operation may be contingent upon the respective bit (e.g., $k_j$) of the plurality of bits of the second input. In some embodiments, the conditional operation updates at least one of the masked accumulator value or the masked auxiliary value. For example, in the course of the Montgomery ladder computations, one of the values R0 or R1 may be squared, whereas the other value may be updated with the product of R0 and R1.

As indicated with block 470, the operations of blocks 420-460 may be repeated for the remaining iterations. At block 480, the processing units performing method 400 may obtain an output of the ladder computation using the masked accumulator value updated during the plurality of iterations. More specifically, after the last iteration, the masked accumulator value may be $R0=Z\cdot[M(0)]^2$ (e.g., $Z\cdot 2^{2Y(0)}$) and the output Z may be obtained by applying the final unmasking value to the accumulator value (e.g., $Z=R0\cdot 2^{-2Y(0)}$). Any of the above-described operations of method 400 may be modular operations modulo a suitably chosen modulus P.

Although method 400 is illustrated using the Montgomery ladder as an example, it should be understood that other ladder computations may be performed using similar techniques. For example, the computations of the Joye double-and-add ladder may be performed in the opposite direction, starting from the least significant bit $k_0$ and iteratively processing more significant bits, e.g., $k_1, k_2$, etc. The initial registers may be seeded similarly to the Montgomery ladder, R0←1, R1←X, whereas computations may be performed as follows. During each of n iterations, a value stored in one of the registers R0 and R1 remains unchanged, whereas the value stored in the other register is squared and multiplied by the value stored in the first register. The register whose content is unchanged is determined by the value of the bit $k_j$; e.g., the value $k_j=0$ indicates that the number in the register R0 is unchanged: R0←R0, R1←$(R1)^2$·R0, while the value $k_j=1$ indicates that the number in the register R1 is unchanged: R0←$(R0)^2$·R1, R1←R1. In the Joye double-and-add ladder embodiments, each unmasking value may be an inverse cube of a masking value for the previous iteration: $UM(j+1)=[M(j+1)]^{-3}$ (e.g., resulting in the masking factor $MF(j)=2^{Y(j)-Y(j+1)}$ for the register whose value is changed and the masking factor $MF(j)=2^{Y(j)-Y(j+1)}$ for the register whose value remains unchanged), while other operations may be performed similarly to the operations described above.

FIG. 5 is a flow diagram of example method 500 of ladder computations with iteration masking that deploys Montgomery multiplication for enhanced protection against side-channel attacks, in accordance with at least some embodiments. In some embodiments, method 500 may include, at block 510, storing a first initial value as an accumulator value and storing a second initial value as an auxiliary value. At least one of the first initial value or the second initial value may be based on the first input into ladder computations. For example, the first initial value an integer power of base number (e.g., power of two), e.g., the first initial value may be $2^{2n+2r}$ The second initial value may be a multiplication product of the first initial value and the first input (e.g., X). In some embodiments, the multiplication product of the first initial value and the first input may be computed as Mont1[X, $2^{2n+2r}$], where Mont1[A, B] is the first Montgomery multiplication operation applied to numbers A and B. The first Montgomery multiplication operation may be associated with a first Montgomery radix, $2^{2r}$.

Method 500 may include a plurality of iterations. Each of the plurality of iterations $j=n-1, n-2, \ldots 1, 0$ may be associated with a respective bit $k_j$ of the plurality of bits ($k_{n-1}, k_{n-2}, \ldots k_1, k_0$) of the second input K. The operations of each iteration may include blocks 520-550. In particular, at block 520, e.g., during performance of iteration j, the processing units performing method 500 may select a masking factor that includes a positive power of a base number (e.g., $2^{r+Y(j)-2Y(j+1)}$). As illustrated in the top callout portion of FIG. 5, in some embodiments, selecting the masking factor may include identifying, at block 522, an unmasking value (e.g., $2^{r-2Y(j+1)}$) for a previous iteration (e.g., iteration j+1) of the plurality of iterations. In some embodiments, the unmasking value includes the base number (e.g., 2) raised to a power of a positive unmasking exponent. For example, the positive unmasking exponent (e.g., $r-2Y(j+1)$) may be equal to a difference of (i) a binary logarithm of a square of the first Montgomery radix (e.g., $r=\log_2 \sqrt{2^{2r}}$) and (ii) double a masking exponent for the previous iteration of the plurality of iterations. (e.g., $2 \times Y(j+1)$). At block 524, method 500 may include selecting a masking exponent (e.g., $Y(j)$) for the current iteration. At block 526, method 500 may include multiplying the unmasking value (e.g., $2^{r-2Y(j+1)}$) by the base number (e.g., 2) raised to a power of the masking exponent to obtain the masking value (e.g., $MF(j)=2^{r-2Y(j+1)} \times 2^{Y(j)}$).

At block 530, the processing units performing method 500 may apply the first Montgomery multiplication operation to the accumulator value and the masking factor $MF(j)$ to obtain a masked accumulator value (e.g., $R0 \leftarrow Mont1[R0, MF(j)]$). At block 540, the processing units performing method 500 may apply the first Montgomery multiplication operation to the auxiliary value and the masking factor to obtain a masked auxiliary value (e.g., $R1 \leftarrow Mont1[R1, MF(j)]$). At block 550, the processing units may perform a conditional operation. The conditional operation may be contingent upon the respective bit (e.g., $k_j$) of the plurality of bits of the second input. In some embodiments, the conditional operation updates at least one of the masked accumulator value or the masked auxiliary value. For example, in instances of the Joye double-and-add ladder, the masked accumulator value or the masked auxiliary value (depending on the value of the bit $k_j$) may be updated during each iteration. In the instances of the Montgomery ladder, both the masked accumulator value and the masked auxiliary value may be updated during each iteration. For example, during the performance of the conditional operation of the Montgomery ladder, the processing units may identify that the bit $k_j$ has a first bit value (e.g., $k_j=0$). Responsive to such identification, the processing units may update the accumulator value with a square of the masked accumulator value. The processing units may further update the auxiliary value with a multiplication product of the masked accumulator value and the masked auxiliary value.

As illustrated by the bottom callout portion in FIG. 5, in some embodiments, performing the conditional operation may include applying a second Montgomery multiplication operation to the masked accumulator value and the masked auxiliary value. The second Montgomery multiplication operation may be associated with a second Montgomery radix (e.g., $2^n$). The first Montgomery radix may be smaller than the second Montgomery radix (e.g., $2r<n$)). The bit value $k_j=0$ may indicate that the second Montgomery multiplication operation is used to square the accumulator value (e.g., $R0 \leftarrow Mont2[R0, R0]$) and to update the auxiliary value with the product of the (pre-update) accumulator value and the auxiliary value (e.g., $R1 \leftarrow Mont2[R0, R1]$). Similarly, the bit value $k_j=1$ may indicate that the second Montgomery multiplication operation is used to square the auxiliary value (e.g., $R1 \leftarrow Mont2[R1, R1]$) and to update the accumulator value with the product of the accumulator value and the (pre-update) auxiliary value (e.g., $R0 \leftarrow Mont2[R0, R1]$).

As indicated with block 560, the operations of blocks 520-550 may be repeated for the remaining iterations. At block 570, the processing units performing method 500 may obtain an output of the ladder computation using the masked accumulator value updated during the plurality of iterations. In some embodiments, obtaining the output of the ladder computation may include applying the first Montgomery multiplication operation to (i) the masked accumulator value and the final unmasking value, as indicated with line 11 in TABLE 3. The final unmasking value, e.g., $UM(0)$, may be selected to compensate for a masking factor selected during a final iteration of the plurality of iterations. In some embodiments, obtaining the output of the ladder computation may include performing additional Montgomery multiplication operations, as indicated with operations of lines 12-13 in TABLE 3.

Figure 6:
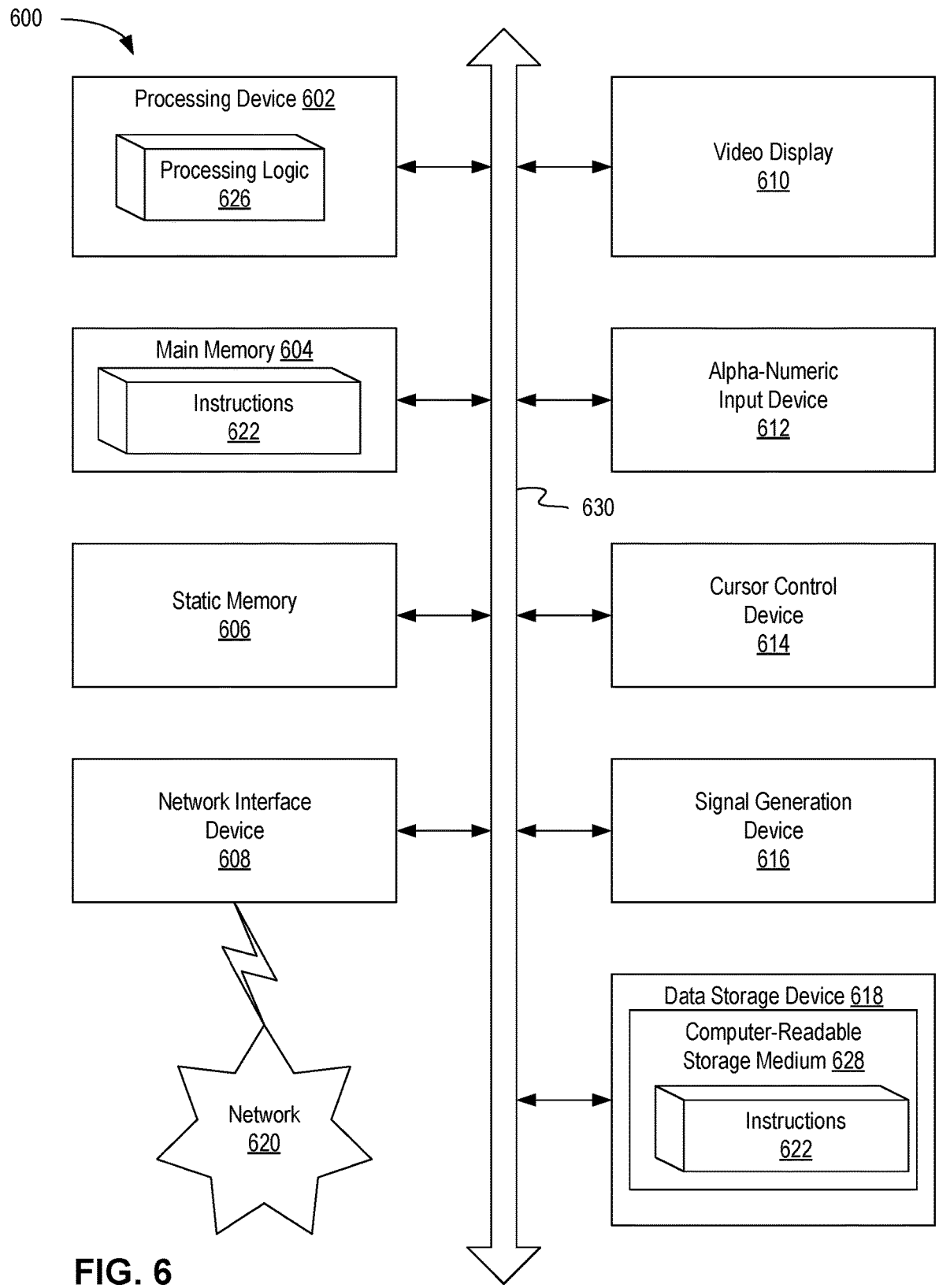
FIG. 6 depicts a block diagram of an example computer system 600 operating in accordance with some implementations of the present disclosure.

FIG. 6 depicts a block diagram of an example computer system 600 operating in accordance with some implementations of the present disclosure. In various illustrative examples, example computer system 600 may be or include computer device 100, illustrated in FIG. 1. Example computer system 600 may be connected to other computer systems in a LAN, an intranet, an extranet, and/or the Internet. Computer system 600 may operate in the capacity of a server in a client-server network environment. Computer system 600 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing method 400 of ladder computations with iteration masking and method 500 of ladder computations with iteration masking that deploys Montgomery multiplication, for enhanced protection against side-channel attacks.

Example computer system 600 may further comprise a network interface device 608, which may be communicatively coupled to a network 620. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory computer-readable storage medium) 628 on which is stored one or more sets of executable instructions 622. In accordance with one or more aspects of the present disclosure, executable instructions 622 may comprise executable instructions implementing method 400 method of ladder computations with iteration masking and method 500 of ladder computations with iteration masking that deploys Montgomery multiplication, for enhanced protection against side-channel attacks.

Executable instructions 622 may also reside, completely or at least partially, within main memory 604 and/or within processing device 602 during execution thereof by example computer system 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on the contrary, the intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. In at least one embodiment, use of the term "set" (e.g., "a set of items") or "subset" unless otherwise noted or contradicted by the context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. In at least one embodiment, the set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or like, refer to action and/or processes of a computer or computing system, or similar electronic computing devices, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method to perform a cryptographic processing of a message, the cryptographic processing comprising a ladder computation for a first input and a second input, wherein at least one of the first input or the second input is based on the message, the method comprising:
    storing, by a processing device, a first initial value as an accumulator value and storing a second initial value as an auxiliary value, wherein at least one of the first initial value or the second initial value is based on the first input;
    performing, by the processing device, a plurality of iterations, wherein each of the plurality of iterations is associated with a respective bit of a plurality of bits of the second input and comprises:
        selecting a masking factor that comprises a positive power of a base number;
        applying a first Montgomery multiplication operation to the accumulator value and the masking factor to obtain a masked accumulator value;
        applying the first Montgomery multiplication operation to the auxiliary value and the masking factor to obtain a masked auxiliary value; and
        performing a conditional operation to update at least one of the masked accumulator value or the masked auxiliary value, wherein the conditional operation is contingent upon the respective bit of the plurality of bits of the second input;
    obtaining, by the processing device, an output of the ladder computation using the masked accumulator value updated during the plurality of iterations; and
    using the output of the ladder computation to obtain at least one of:
        a decryption of the message,
        an encryption of the message, or
        a digital signature for the message.

2. The method of claim 1, wherein the first initial value is an integer power of the base number and the second initial value is a multiplication product of the first initial value and the first input.

3. The method of claim 1, wherein selecting the masking factor comprises:
- identifying an unmasking value for a previous iteration of the plurality of iterations;
- selecting a masking exponent; and
- multiplying the unmasking value by the base number raised to a power of the masking exponent.

4. The method of claim 3, wherein the unmasking value comprises the base number raised to a power of a positive unmasking exponent.

5. The method of claim 4, wherein the positive unmasking exponent is equal to a difference of (i) a binary logarithm of a square of a Montgomery radix of the first Montgomery multiplication operation and (ii) double a masking exponent for the previous iteration of the plurality of iterations.

6. The method of claim 1, wherein performing the conditional operation comprises applying a second Montgomery multiplication operation to the masked accumulator value and the masked auxiliary value.

7. The method of claim 6, wherein the first Montgomery multiplication operation is associated with a first Montgomery radix, the second Montgomery multiplication operation is associated with a second Montgomery radix, and wherein the first Montgomery radix is smaller than the second Montgomery radix.

8. The method of claim 1, wherein performing the conditional operation comprises:
- responsive to identifying that the respective bit of the plurality of bits of the second input has a first bit value, updating the accumulator value with a square of the masked accumulator value.

9. The method of claim 8, wherein performing the conditional operation further comprises:
- updating the auxiliary value with a multiplication product of the masked accumulator value and the masked auxiliary value.

10. The method of claim 1, wherein obtaining the output of the ladder computation comprising:
- applying the first Montgomery multiplication operation to the masked accumulator value and a final unmasking value, wherein the final unmasking value is selected to compensate for a masking factor selected during a final iteration of the plurality of iterations.

11. A method to perform cryptographic processing of a message, the cryptographic processing comprising a ladder computation for a first input and a second input, wherein at least one of the first input or the second input is based on the message, the method comprising:
- storing, by a processing device, a first initial value as an accumulator value and storing a second initial value as an auxiliary value, wherein at least one of the first initial value or the second initial value is based on the first input;
- performing, by the processing device, a plurality of iterations, wherein each of the plurality of iterations is associated with a respective bit of a plurality of bits of the second input and comprises:
  - identifying an unmasking value for a previous iteration of the plurality of iterations;
  - selecting a masking value;
  - obtaining a masking factor using the unmasking value for the previous iteration and the masking value;
  - obtaining, based on the accumulator value and the masking factor, a masked accumulator value;
  - obtaining, based on the auxiliary value and the masking factor, a masked auxiliary value; and
  - performing a conditional operation to update at least one of the masked accumulator value or the masked auxiliary value, wherein the conditional operation is contingent upon the respective bit of the plurality of bits of the second input;
- obtaining, by the processing device, an output of the ladder computation using the masked accumulator value updated during the plurality of iterations; and
- using the output of the ladder computation to obtain at least one of:
  - a decryption of the message,
  - an encryption of the message, or
  - a digital signature for the message.

12. The method of claim 11, wherein the unmasking value for the previous iteration is a square of the masking value for the previous iteration.

13. The method of claim 11, wherein the masking value is a base number raised to a power of a masking exponent, and wherein the masking exponent is greater than twice a masking exponent for the previous iteration of the plurality of iterations.

14. A processor comprising:
- a memory device;
- a plurality of registers; and
- one or more circuits, communicatively coupled to the memory device, to:
  - identify a first input and a second input into a ladder computation wherein at least one of the first input or the second input is based on a message associated with a cryptographic operation;
  - store a first initial value as an accumulator value and store a second initial value as an auxiliary value, wherein at least one of the first initial value or the second initial value is based on the first input into a ladder computation;
  - perform a plurality of iterations, wherein each of the plurality of iterations is associated with a respective bit of a plurality of bits of the second input into the ladder computation, and wherein during each of the plurality of iterations, the one or more circuits are to:
    - select a masking factor that comprises a positive power of a base number;
    - apply a first Montgomery multiplication operation to the accumulator value and the masking factor to obtain a masked accumulator value;
    - apply the first Montgomery multiplication operation to the auxiliary value and the masking factor to obtain a masked auxiliary value; and
    - perform a conditional operation to update at least one of the masked accumulator value or the masked auxiliary value, wherein the conditional operation is contingent upon the respective bit of the plurality of bits of the second input;
  - obtain an output of the ladder computation using the masked accumulator value updated during the plurality of iterations; and
  - use the output of the ladder computation to obtain at least one of:
    - a decryption of the message,
    - an encryption of the message, or
    - a digital signature for the message.

15. The processor of claim 14, wherein to select the masking factor, the one or more circuits are to:
- identify an unmasking value for a previous iteration of the plurality of iterations;
- select a masking exponent; and
- multiply the unmasking value by the base number raised to a power of the masking exponent.

16. The processor of claim 15, wherein the unmasking value comprises the base number raised to a power of a positive unmasking exponent, and wherein the positive unmasking exponent is equal to a difference of (i) a binary logarithm of a square of a Montgomery radix of the first Montgomery multiplication operation and (ii) double a masking exponent for the previous iteration of the plurality of iterations.

17. The processor of claim 14, wherein to perform the conditional operation, the one or more circuits are to apply a second Montgomery multiplication operation to the masked accumulator value and the masked auxiliary value.

18. The processor of claim 17, wherein the first Montgomery multiplication operation is associated with a first Montgomery radix, the second Montgomery multiplication operation is associated with a second Montgomery radix, and wherein the first Montgomery radix is smaller than the second Montgomery radix.

19. The processor of claim 14, wherein to perform the conditional operation, the one or more circuits are to:
- responsive to identifying that the respective bit of the plurality of bits of the second input has a first bit value, update the accumulator value with a square of the masked accumulator value; and
- update the auxiliary value with a multiplication product of the masked accumulator value and the masked auxiliary value.

20. The processor of claim 14, wherein to obtain the output of the ladder computation, the one or more circuits are to:
- apply the first Montgomery multiplication operation to the masked accumulator value and a final unmasking value, wherein the final unmasking value is selected to compensate for a masking factor selected during a final iteration of the plurality of iterations.

\* \* \* \* \*